US009851621B2

(12) United States Patent
Lang et al.

(10) Patent No.: US 9,851,621 B2
(45) Date of Patent: Dec. 26, 2017

(54) CAMERA FOR VEHICLES, IN PARTICULAR COMMERCIAL VEHICLES

(71) Applicants: Werner Lang, Ergersheim (DE); Peter Geissendörfer, Ergersheim (DE); Simon Deffner, Flachslanden (DE); Jens Stürzenhofecker, Markt Erlbach (DE)

(72) Inventors: Werner Lang, Ergersheim (DE); Peter Geissendörfer, Ergersheim (DE); Simon Deffner, Flachslanden (DE); Jens Stürzenhofecker, Markt Erlbach (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 227 days.

(21) Appl. No.: 14/573,699

(22) Filed: Dec. 17, 2014

(65) Prior Publication Data

US 2015/0168813 A1    Jun. 18, 2015

(30) Foreign Application Priority Data

Dec. 18, 2013   (DE) .......................... 10 2013 021 622

(51) Int. Cl.
| | | |
|---|---|---|
| H04N 5/225 | (2006.01) | |
| H04N 7/18 | (2006.01) | |
| G03B 17/08 | (2006.01) | |
| G06K 9/20 | (2006.01) | |
| B60R 11/04 | (2006.01) | |

(52) U.S. Cl.
CPC ........... *G03B 17/08* (2013.01); *H04N 5/2252* (2013.01); *H04N 5/2257* (2013.01); *B60R 11/04* (2013.01); *G06K 9/209* (2013.01)

(58) Field of Classification Search
CPC .... H04N 5/2252; H04N 5/2254; G03B 17/08; B29L 2011/00
USPC ................... 348/148, 335, 373, 374; 264/1.7
See application file for complete search history.

(56) References Cited

U.S. PATENT DOCUMENTS

| | | | |
|---|---|---|---|
| 6,507,700 B1 | 1/2003 | Takekuma et al. | |
| 8,123,420 B2 | 2/2012 | Gottwald et al. | |
| 2006/0216020 A1 | 9/2006 | Lang et al. | |
| 2009/0244361 A1 | 10/2009 | Gebauer et al. | |
| 2010/0097519 A1* | 4/2010 | Byrne | B60R 1/00 348/373 |
| 2011/0298925 A1* | 12/2011 | Inoue | H04N 5/2252 348/148 |

(Continued)

FOREIGN PATENT DOCUMENTS

| | | |
|---|---|---|
| DE | 1 876 355 | 7/1963 |
| DE | 10 2004 049 871 | 4/2006 |

(Continued)

*Primary Examiner* — Thai Tran
*Assistant Examiner* — Syed Hasan
(74) *Attorney, Agent, or Firm* — Cozen O'Connor

(57) ABSTRACT

A camera for use on vehicles, in particular commercial vehicles. The camera has a housing including a first accommodation portion and a second accommodation portion, an optical element disposed within the first accommodation portion, and a digital image capturing unit provided on a circuit board. The circuit board is disposed within the second accommodation portion. The housing is formed by a first part consisting of plastic and a second part which is vapor resistant.

28 Claims, 2 Drawing Sheets

(56) References Cited

U.S. PATENT DOCUMENTS

2013/0075941 A1* 3/2013 Chang ............... B29C 45/14311
264/1.7
2013/0155311 A1* 6/2013 Grandin ............... H04N 5/2257
348/335

FOREIGN PATENT DOCUMENTS

DE  20 2005 004 675    8/2006
WO  WO 2006/136208    12/2006

* cited by examiner

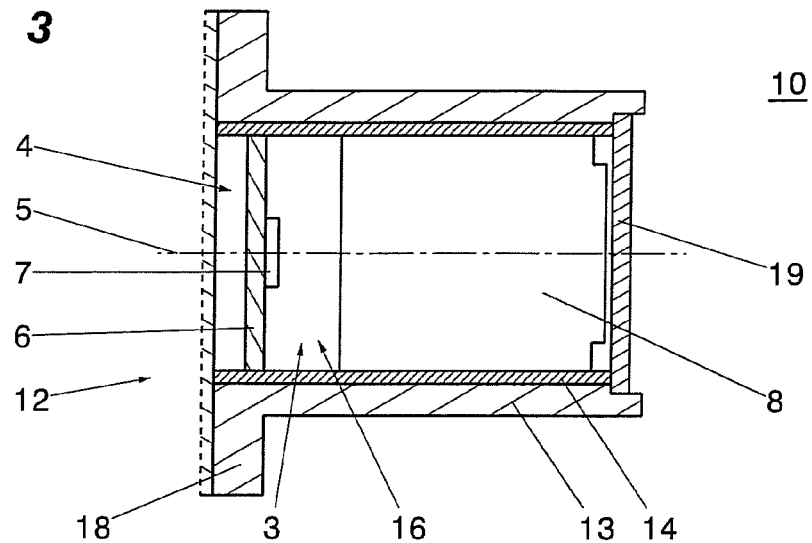
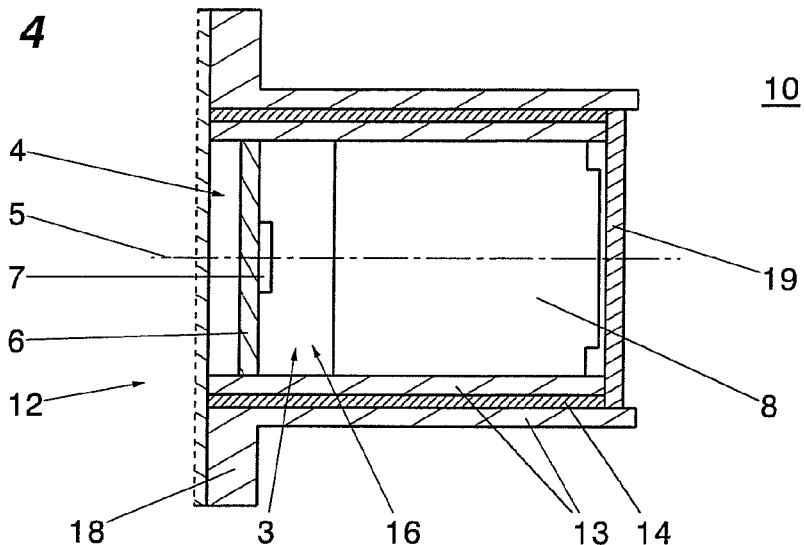
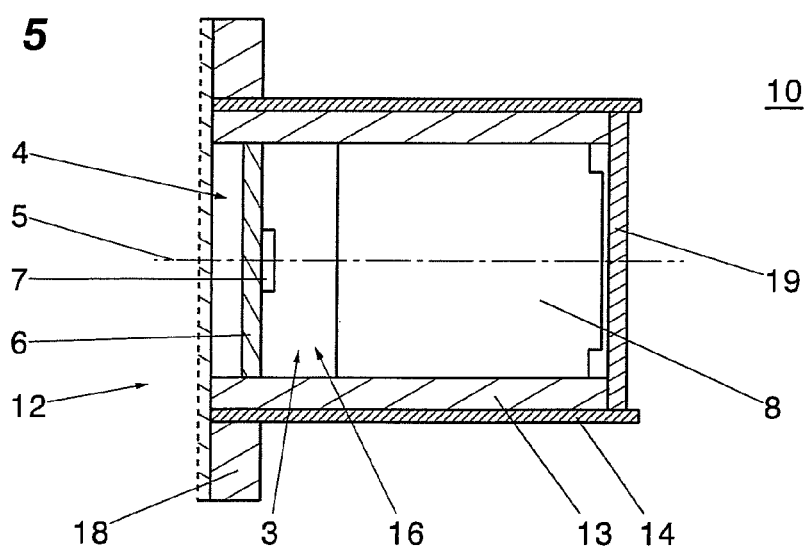

CAMERA FOR VEHICLES, IN PARTICULAR COMMERCIAL VEHICLES

BACKGROUND OF THE INVENTION

1. Field of the Invention

The present application relates to a camera for use on a vehicle, for example a commercial vehicle.

2. Description of the Related Art

In recent times it has been increasingly considered to use, besides conventional mirrors as means for indirect vision, in addition to or as a replacement for these mirrors, camera systems or image-capturing systems as means for indirect vision, in which an image-capturing unit, for example a camera, continuously detects a recorded image, these (video) data captured by the image-capturing unit are submitted, for example, by means of a processing unit and possibly, after further processing, to a display unit within the driver's cab, which display unit permanently and in real time and always visibly displays the respective captured field of vision and possibly further information, for example references to collisions, distances or the like, in respect to the area around the vehicle.

Cameras usually include a housing having an image sensor disposed therein and an optical element, for example a lens. It is known to dispose the image sensor and the optical element in a holder or a connection member, wherein the holder or connection member are then disposed in a separate housing that is, in turn, mounted to a vehicle.

In order to capture a recorded image of a desired quality, the optical element needs to be focused, aligned, fixed, and sealed relatively to the image sensor. In this respect, focusing the optical element describes setting the distance between the last optical surface and the image plane of the image sensor, such that a desired sharpness of the image is achieved. The alignment of the optical element describes setting the optical axis of the optical element relative to the image sensor. When the optical element is focused and aligned relative to the image sensor, the optical element needs to be fixed in this desired position within the housing and the housing, in particular the portion of the optical path, needs to be sealed against penetration of dust, water, water vapour and other foreign matter. The portion between the optical element and the image sensor describes the optical path.

The holder or the connection element is usually made of plastic and is then mounted in the separate housing that can keep off water vapour, steam, and/or dust. In other known embodiments, the holder or connection element is made of metal, for example aluminum, and already keeps off harmful water vapour from entering the optical path between the optical element and the image sensor.

DE 20 2005 004 675 U1 discloses a camera including a module having electronics and a lens with two ends. A camera housing includes a receiving opening, and is made from plastic. A transparent, exposure window closes the opening, and is arranged behind one of the lens end, where the window is made of plastic. A hollow space arranged between the housing and the module is filled with a sealing compound of plastic.

US 2010/0097519 A1 discloses a compact camera and a wire system for use in vehicles.

U.S. Pat. No. 6,507,700 B1 discloses a waterproof camera with a waterproof camera housing.

DE 18 76 355 U discloses a setting unit for photographic devices, in particular fasteners.

SUMMARY OF THE INVENTION

It is an object of the present application to provide a camera which is steam tight and/or vapour resistant, in particular against water vapour, while ensuring cost-effective and simple production with few manufacturing steps.

The present application is based on the idea of designing the holder or connection element in such a way that vapour resistance in the vicinity of the optical element, in particular in the vicinity of the optical path, is ensured without necessarily providing an additional housing surrounding the holder. Therefore, a camera for use on a vehicle, in particular a commercial vehicle, is provided which includes a housing having a first accommodation portion and a second accommodation portion. At least one optical element is disposed within the first accommodation portion and includes at least one digital image capturing unit provided on a circuit board. The circuit board is disposed within the second accommodation portion. The housing is formed of at least one first part consisting of plastic and of at least one second part which is vapour resistant. Thus, on the one hand, the housing provides a good formability through being manufactured of plastic, and on the other hand a good sealing effect against vapour, in particular water vapour, by inserting the vapour resistant part into the housing or providing the vapour resistant part at the housing, respectively. Therefore, additional manufacturing and mounting steps can be omitted and the manufacturing steps and manufacturing costs can be reduced in total.

Preferably, the first part surrounds the second part in a radial direction. It is preferred that the first part is indivisibly connected to the second part. Therefore, in one embodiment, the first part completely encompasses the second part with respect to the optical axis at least in a radial direction, such that the second part is embedded in the first part. For example, the second part is completely overmoulded by the first part at least in the radial direction, for example, by plastic injection moulding. In order to connect the first part indivisibly to the second part, it is preferred that the first and second parts are, for example, connected to one another by form-fitting.

According to the present disclosure, it is preferred that the vapour resistant part is disposed where the optical element, with respect to the longitudinal direction of the housing, is not located to prevent penetration of vapour, in particular water vapour, into the optical path. The optical path is a portion in the housing which is disposed between the optical element and the digital image capturing unit. Preferably, the vapour resistant part is also at least partially provided at a location where the optical element is disposed to increase vapour resistance and to decrease the risk of vapour penetration. The first and second accommodation portions are recesses in the housing in which the optical element and the group of circuit boards are disposed, respectively. The first accommodation portion is preferably a cylindrical recess in the housing and extends from a front side of the housing to interior of the housing. The front side of the housing is the side of the housing where the object to be captured by the camera is located. The second accommodation portion is also preferably a cylindrical recess and extends from a rear side of the housing opposite to the front side of the housing to the interior of the housing. In one embodiment, the first accommodation portion has a smaller diameter than the second accommodation portion. Alternatively, the first and second accommodation portions may have equal diameters.

Preferably, the at least one second part is at least partially embedded within, integrated within, or indivisibly attached to the at least one second part. In a preferred embodiment, the at least one second part is made of metal, such as, for example, aluminium, copper, zinc, magnesium, and/or brass. The manufacturing method of the housing is made, for example, by a metal insert process in which preferably metal members are inserted into an injection moulding mould and at least partially overmoulded with plastic. The second part is preferably a die-cast component manufactured in a die-cast process or a continuous casting component manufactured in a continuous casting process.

The good properties of both materials can be advantageously employed using the metal insert process. Within the scope of the present disclosure, the vapour resistance of the second part and the easy formability of the first part consisting of plastic are used as preferred properties. For this reason, the vapour resistant part has a more simple geometry than the plastic part, such that the plastic part has a more complex geometry due to its easy formability. The vapour resistant second part, for example, is cylindrically formed, while the easily formable first part adopts the shape of the complete inner and outer shaping.

In another embodiment, the housing can be manufactured with a two-component technique, in which two different materials are merged to a single member. A possible variant are hard-soft-compositions which can be produced by injection moulding.

In a further preferred embodiment, the at least one optical element is screwed into the first accommodation portion via a thread. The first accommodation portion is preferably made of plastic so that the thread can already be formed during the injection moulding process without subsequent machining or by screwing by manufacturing the corresponding inner cylinder earlier on and only rough guides for inserting the thread by screwing the counter parts are provided. In such embodiments, the vapour resistant second part is integrated, embedded, or attached to the plastic part. In an alternative embodiment, the first accommodation part is formed by the second part, wherein the first accommodation portion in turn includes a thread into which the at least one optical element can be screwed and, therefore, can be aligned and focussed relative to the digital image capturing unit.

In a further embodiment, the housing includes a connection portion adapted to mount the housing to a vehicle, in particular a commercial vehicle. The connection portion, for example an attachment flange, can further be adapted to mount the housing at a further housing, for example, in an additional metal housing of the camera. Preferably, the connection portion is formed by the at least one easily formable first part, such that the connection portion is integrally formed with the first part.

In each of the embodiments, the circuit board can be disposed within the second accommodation portion by adhesive bonding, screwing, or in any other manner, such that the circuit board is relatively fixed within the housing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, exemplary embodiments are described with respect to the accompanying drawings, in which:

FIG. 3 depicts a sectional view of a further embodiment of a camera according to the present disclosure;

FIG. 4 depicts a sectional view of a further embodiment of a camera according to the present disclosure; and FIG. 5 depicts a sectional view of a further embodiment of a camera according to the present disclosure.

DETAILED DESCRIPTION OF THE PRESENTLY PREFERRED EMBODIMENTS

Figure 1:
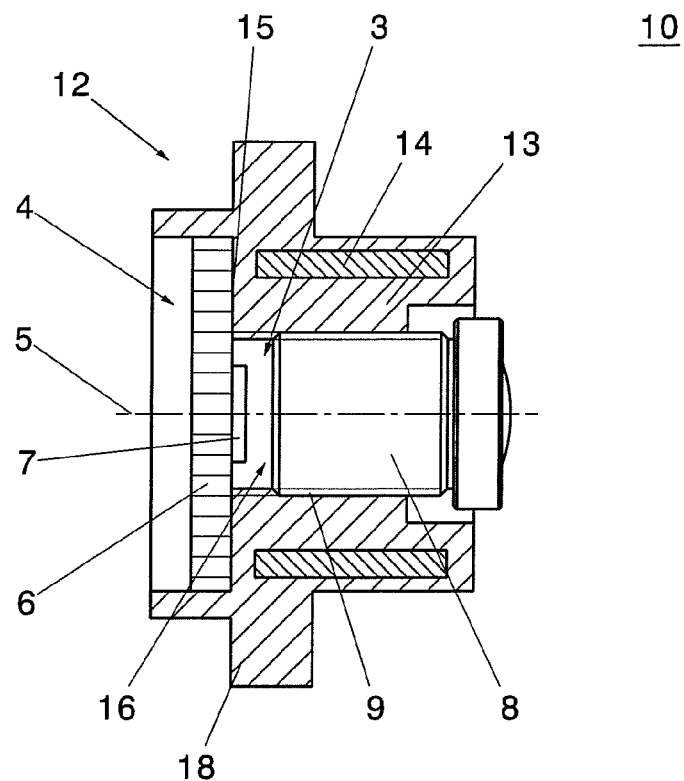
FIG. 1 depicts a sectional view of a first embodiment of a camera according to the present disclosure.

FIG. 1 shows a first embodiment of a camera 10 according to the present disclosure. The camera 10 includes a housing 12 having in its interior a first accommodation portion 3 and a second accommodation portion 4. The first accommodation portion 3 extends from a front side of the housing to the interior of the housing. The front side of the housing is the side of the housing on which the object to be captured by the camera 10 is disposed. The second accommodation portion 4 extends from a rear side of the housing to the interior of the housing. The rear side of the housing is opposite to the front side of the housing with respect to an optical axis 5. The first accommodation portion 3 has a first diameter D1 smaller than a second diameter D2 of the second accommodation portion 4.

In the second accommodation portion 4, a circuit board 6 is disposed to which at least one digital image capturing unit 7 in the form of an image sensor is mounted, for example a CCD- or a CMOS-sensor including photo-sensitive electronic members which functions are based on the inner photo effect. The circuit board 6 is mounted on a flange 15 disposed at a transition between the first and second accommodation portions 3, 4. Further electronic members are provided at the circuit board 6, which serve to control and perform functionalities required by the camera, but for the sake of simplicity are not shown in the drawings.

An optical element 8, for example a lens with a lens system, is disposed within the first accommodation portion 3, wherein the optical element 8 is screwed into the first accommodation portion 3 via a thread 9. The optical element 8 is substantially coaxial with respect to the first and second accommodation portions 3, 4. The optical element 8 defines the optical axis 5 extending preferably through the center of the digital image capturing unit 7. During mounting of the optical element 8, the optical element 8 needs to be disposed relative to the digital image capturing unit 7, such that a distance between the optical element 8 and the digital image capturing unit 7 which sets the focus, and the alignment of the optical axis 5 relative to the digital image capturing unit 7 is provided as desired.

In one embodiment, the circuit board 6 is attached at the flange 15 via an adhesive. The adhesive is, for example, a single-component epoxy resin adhesive made of a thermosetting, sol-vent-free reaction resin mass or an adhesive filled with a filler added with solid components such as, for example, quartz powder, chalk, metal powder, soot, etc.

As shown in FIG. 1, the housing 12 consists of a first part 13 and a second part 14, which is completely encompassed by the first part 13. The second part 14 is, thus, completely embedded in the first part 13. The first part 13 preferably consists of plastic and the second part 14 preferably consists of metal, such as, for example, aluminum. The second part 14 is vapour resistant, such that an optical path 16 which defines the portion within the housing 12 between the digital image capturing unit 7 and the optical element 8 is sealed against the environment in a vapour resistant manner. The optical path 16 is preferably a free, non-filled portion between the digital image capturing unit 7 and the optical element 8. It is mostly the plastic part 13 which is not vapour resistant. Therefore, the second vapour resistant part 14 is provided.

To ensure that the optical path 16 is leak-proof, the circuit board 6 as well as the optical element 8 are sealingly disposed within the housing 12, such that penetration of foreign matter and foreign materials is impossible due to the connection portions between the optical element 8 and the first accommodation portion 3 and between the circuit board 6 and the second accommodation portion 4, respectively. It can further be seen in FIG. 1 that the second vapour resistant part 14 is provided where the radially shortest path from the environment into the optical path 16 extends. Therefore, a portion of the first part 13 can be disposed beside the left end of the second part 14, because at this location, the radial thickness of the first part 13 provided by a connection portion 18 provides sufficient vapour resistance. The same applies to the portion at the right side of the second part 14, because at this location, the optical element 8 which is disposed in a vapour resistant manner in the first accommodation portion 3, is located, which must not necessarily be sealed.

The housing 12 according to the first embodiment can be formed by, for example, a metal insert method in which the metal part 14 is inserted into an injection moulding mould and subsequently overmoulded with plastic, such that the first part 13 is formed. Preferably, the thread 9 in the first part 13 is already formed during metal insertion, such that no subsequent thread-manufacturing process is necessary.

Because of the good formability of the first part 13 which is made of plastic and the vapour resistance of the second part 14, the housing 12 can be directly attached to a vehicle, particularly a commercial vehicle, via the connection portion 18, wherein no additional tight housing is necessary. The connection portion 18 is integrally connected to the first part 13.

Figure 2:
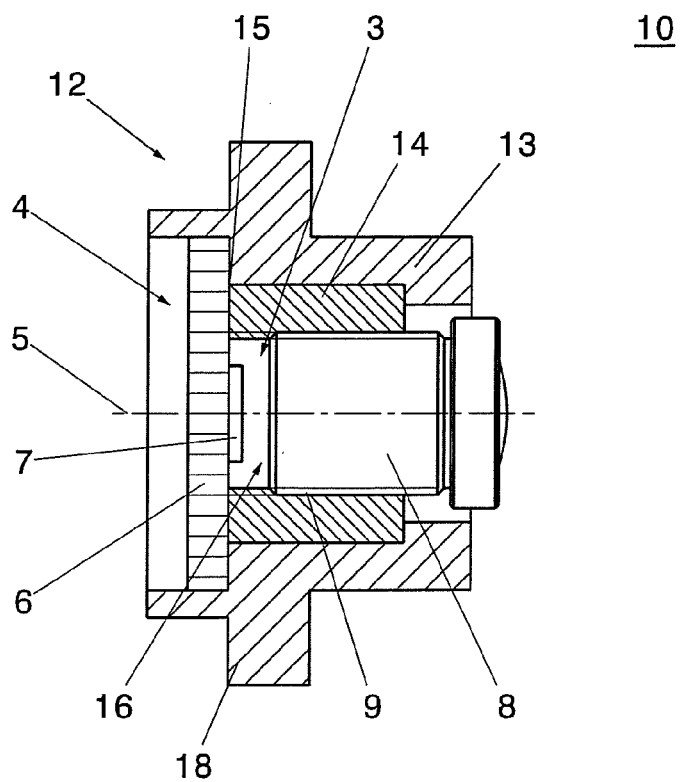
FIG. 2 depicts a sectional view of a further embodiment of a camera according to the present disclosure.

With respect to FIG. 2, a further embodiment of a camera 10 according to the present disclosure is shown. Elements already known from FIG. 1 are given identical reference numbers in FIG. 2. The camera 10 of FIG. 2 differs from the camera 10 of FIG. 1 in that the second part 14 is disposed in the first part 13. The second part 14 is thus encompassed by the first part 13 in a radially outward direction. Prior to the injection moulding process, the second part 14 already includes a thread 9, into which the optical element 8 can be screwed. The second part 14 is inserted into an injection moulding mould, and then overmoulded by plastic so that the first part 13 is formed and connected to the second part 14.

FIG. 3 shows a further embodiment of a camera 10 according to the present disclosure. Elements already known from FIGS. 1 and 2 are given identical reference numbers in FIG. 3. The camera 10 of FIG. 3 differs from the cameras 10 of FIGS. 1 and 2 in that the housing 12 includes only one accommodation portion 3, in which the circuit board 6 as well as the optical element 8 are disposed. Therefore, a flange 15 is not provided in the housing 12. The accommodation portion 3 is also cylindrically formed and extends concentrically from the front side of the housing to the rear side of the housing with respect to the optical axis 5. The optical element 8 is, for example, glued into the accommodation portion 3, but in another embodiment, as shown in FIGS. 1 and 2, can also be screwed therein. At the object side, the housing 12 is closed with a cover glass 19 in an airtight and/or watertight manner.

The second part 14 which forms the cylindrical accommodation portion 3 extends along the entire length of the housing 12 and is completely encompassed by the first part 13 in a radially outward direction. Due to the extension of the second part 14 along the entire length of the housing 12 in connection with the vapour resistant mounting of the circuit board 6 and the optical element 8 in the accommodation portion 3, the optical path 16 is shielded from the surroundings in a vapour resistant manner and protected from undesired vapour and/or steam penetration.

FIG. 4 shows a further embodiment of a camera 10 according to the present disclosure. Elements already known from FIGS. 1 to 3 are given identical reference numbers in FIG. 4. The camera 10 of FIG. 4 differs from the camera 10 of FIG. 3 in that the second part 14 is completely encompassed by the first part 13 in a radial direction. In such a configuration, the optical element 8 is mounted to the first part 13 in the accommodation portion 3 by, for example, pressing or screwing.

FIG. 5 shows a further embodiment of a camera 10 according to the present disclosure. Elements already known from FIGS. 1 to 4 are given identical reference numbers in FIG. 5. The camera 10 of FIG. 5 differs from the camera 10 of FIG. 3 in that the first part 13 is disposed within the second part 14 in a radial direction. Therefore, the second part 14 which consists of aluminum forms a vapour resistant casing and keeps off all foreign matter, in particular, vapour and/or steam, from the optical path 16.

With reference to FIGS. 1 to 5, it is to be noted that each shown embodiment can be provided with or without the cover glass 19. Further, the optical element can be inserted into the accommodation portion by screwing, pressing or arranging in any other manner in the housing, such that the optical element is aligned and focused with respect to the digital image capturing unit. Due to the free formation of the first part, it is also possible to manufacture most different geometries which are vapour resistant because of a second integrated part. Furthermore, by integrally forming different portions, for example, integrally forming the connection portion and the first part, the number of elements can be reduced, which leads to a reduction of manufacturing and assembling steps as well as manufacturing time.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A camera having an optical axis for use on vehicles comprising:
a housing having a first accommodation portion and a second accommodation portion;
an optical element disposed along the optical axis within the first accommodation portion; and
a digital image capturing unit provided on a circuit board, the digital image capturing unit disposed along the optical axis and spaced from the optical element to define an optical path therebetween;
wherein the circuit board is disposed within the second accommodation portion, and
wherein the housing is formed from a first part consisting of plastic and a second part consisting of a vapor resistant material, the second part radially surrounding at least a portion of the optical element and the optical path in an overlapping manner about the optical axis in an axial direction such that penetration of vapor into the optical path disposed between the optical element and the digital image capturing unit is prevented.

2. The camera according to claim 1, wherein the second part is at least partially embedded within the first part.

3. The camera according to claim 1, wherein the second part is made of one of aluminum, zinc, magnesium, copper, and brass.

4. The camera according to claim 3, wherein the metal is one of aluminum, zinc, magnesium, copper and/or brass.

5. The camera according to claim 1, wherein the second part is one of a die-cast part and a continuous casting part.

6. The camera according to claim 1, wherein the optical element is screwed into the first accommodation portion via a thread.

7. The camera according to claim 1, wherein the first accommodation portion and/or the second accommodation portion is formed by the first part.

8. The camera according to claim 1, wherein the first accommodation portion and/or the second accommodation portion is formed by the second part.

9. The camera according to claim 1, wherein the first accommodation portion is cylindrically formed with a first diameter and/or the second accommodation portion is cylindrically formed with a second diameter, the first diameter being smaller than the second diameter.

10. The camera according to claim 9, further comprising a flange disposed between the first accommodation portion and the second accommodation portion, wherein the circuit board is attached to the flange.

11. The camera according to claim 1, wherein the second part is radially inwardly disposed with respect to the first part, or the second part is radially outwardly disposed with respect to the first part.

12. The camera according to claim 1, wherein the first part is connected to the second part by an injection moulding process.

13. The camera according to claim 1, wherein the housing further comprises a connection portion configured to mount the housing on a vehicle.

14. The camera according to claim 13, wherein the connection portion is integrally formed with the first part.

15. The camera according to claim 13, wherein the connection portion is configured to mount the housing to a commercial vehicle.

16. The camera according to claim 13, wherein the optical element is disposed within the first accommodation portion in a vapor resistant manner and/or the circuit board is disposed within the second accommodation portion in a vapor resistant manner.

17. The camera according to claim 1, wherein the optical element is disposed within the first accommodation portion in a vapor resistant manner and/or the circuit board is disposed within the second accommodation portion in a vapor resistant manner.

18. The camera according to claim 17, wherein the first accommodation portion and/or the second accommodation portion is formed by the first part.

19. A camera having an optical axis for use on vehicles comprising:
a housing having a first accommodation portion and a second accommodation portion;
an optical element disposed along the optical axis within the first accommodation portion; and
a digital image capturing unit provided on a circuit board, the digital image capturing unit disposed along the optical axis and spaced from the optical element to define an optical path therebetween;
wherein the circuit board is disposed within the second accommodation portion,
wherein the housing is formed from a unitary first part consisting of plastic and a second part consisting of a vapor resistant material, the second part radially surrounding a portion of the optical path about the optical axis such that penetration of vapor into the optical path disposed between the optical element and the digital image capturing unit is prevented, and
wherein the second part of the housing consisting of a vapor resistant material radially surrounds at least a portion of the optical element in an overlapping manner about the optical axis at least partly in an axial direction.

20. The camera according to claim 19, wherein the second part is at least partially embedded within the first part.

21. The camera according to claim 19, wherein the second part is made of one of aluminum, zinc, magnesium, copper, and brass.

22. The camera according to claim 19, wherein the second part is one of a die-cast part and a continuous casting part.

23. The camera according to claim 19, wherein the optical element is screwed into the first accommodation portion via a thread.

24. The camera according to claim 19, wherein the first accommodation portion and/or the second accommodation portion is formed by the first part.

25. The camera according to claim 19, wherein the first accommodation portion and/or the second accommodation portion is formed by the second part.

26. The camera according to claim 19, wherein the first accommodation portion is cylindrically formed with a first diameter and/or the second accommodation portion is cylindrically formed with a second diameter, the first diameter being smaller than the second diameter.

27. The camera according to claim 19, wherein the second part is radially inwardly disposed with respect to the first part, or the second part is radially outwardly disposed with respect to the first part.

28. The camera according to claim 19, wherein the housing further comprises a connection portion configured to mount the housing on a vehicle.

* * * * *